(12) United States Patent
Brown et al.

(10) Patent No.: US 7,113,953 B2
(45) Date of Patent: Sep. 26, 2006

(54) SYSTEM AND METHOD FOR EFFICIENTLY WRITING DATA FROM AN IN-MEMORY DATABASE TO A DISK DATABASE

(75) Inventors: Kevin Brown, San Rafael, CA (US); Michael John Elvery Spicer, Lafayette, CA (US)

(73) Assignee: International Business Machines Corporation, Armonk, NY (US)

(*) Notice: Subject to any disclaimer, the term of this patent is extended or adjusted under 35 U.S.C. 154(b) by 433 days.

(21) Appl. No.: 10/611,552

(22) Filed: Jun. 30, 2003

(65) Prior Publication Data

US 2004/0267776 A1    Dec. 30, 2004

(51) Int. Cl.
  *G06F 17/30* (2006.01)
(52) U.S. Cl. .............. 707/101; 707/100; 707/102; 707/206
(58) Field of Classification Search ............... 707/100, 707/101, 102, 206, 1
  See application file for complete search history.

(56) References Cited

U.S. PATENT DOCUMENTS

| | | | | |
|---|---|---|---|---|
| 5,016,221 | A | * | 5/1991 | Hamstra ................ 365/221 |
| 5,870,751 | A | * | 2/1999 | Trotter .................. 707/102 |
| 6,032,158 | A | | 2/2000 | Mukhopadhyay et al. .. 707/201 |
| 6,128,771 | A | * | 10/2000 | Tock et al. ............. 717/111 |
| 6,205,449 | B1 | | 3/2001 | Rastogi et al. ........... 707/202 |
| 6,298,425 | B1 | | 10/2001 | Whitaker et al. ......... 711/162 |
| 6,321,234 | B1 | | 11/2001 | Debrunner ............... 707/202 |
| 6,341,288 | B1 | | 1/2002 | Yach et al. ............ 707/103 R |
| 6,457,021 | B1 | | 9/2002 | Berkowitz et al. ........ 707/201 |
| 2002/0029214 | A1 | | 3/2002 | Yianilos et al. .......... 707/7 |
| 2002/0174138 | A1 | | 11/2002 | Nakamura et al. ........ 707/200 |

OTHER PUBLICATIONS

"Tamino-Mobile The portable XML database that lets you take your most important XML data anywhere!" Software AG the XML Company, 2002.
"TimesTen 5.0, Real-Time Event Processing System," available at http://www.timesten.com/products/timesten/, as of Jun. 29, 2003.
"The Role of In-Memory Database Systems in Routing Table Management for IP Routers," McObject LLC, 2002.
"Process Software, PMDF Support, PMDF V6.0-23 Patches & Enhancements," available at http://www.process.com/techsupport/pmdf/counters.html, as of Dec. 20, 2002.

\* cited by examiner

*Primary Examiner*—Jeffrey Gaffin
*Assistant Examiner*—Monica Pyo
(74) *Attorney, Agent, or Firm*—Samuel A. Kassatly

(57) ABSTRACT

A system and associated method write data from an in-memory database to a disk database in an efficient manner and with a relatively short lag time. The integration of data from in-memory to disk is achieved by limiting the operations of the in-memory database to insert only. The system shortens lag time by reducing the number of transactions required to transfer data from in-memory database to disk memory. The system compiles into an RDBMS, knowledge about the structure of the in-memory database, and then uses the end of the transaction callbacks from the RDBMS to keep the in-memory database and the disk memory in synch. The RDBMS includes a daemon that runs periodically to find records in the in-memory database that have not yet been written to the RDBMS, and then writes the found records to the RDBMS as part of a single transaction. If the transaction completes successfully, the in-memory database is updated to reflect which records have been "flushed" to the RDBMS. If the transaction fails, no action is taken. The present system synchronizes the in-memory database with the RDBMS.

29 Claims, 6 Drawing Sheets

SYSTEM AND METHOD FOR EFFICIENTLY WRITING DATA FROM AN IN-MEMORY DATABASE TO A DISK DATABASE

FIELD OF THE INVENTION

The present invention generally relates to the field of real-time processing of data streams. More specifically, this invention pertains to a system and method for efficiently writing data from an in-memory database to a disk memory with lag times on the order of seconds.

BACKGROUND OF THE INVENTION

The time-based data from a real-time feed is typically being transferred to a database such as a relational data base management system, RDBMS. One example of such a real-time stream of data would be quotes on stocks being traded. Within the RDBMS, data is organized such that it can be easily found. For example, if a user were to request a quote for IBM stock, the price would be quickly found. However, the real-time stream of data is initially stored in a memory buffer then transferred to disk memory. With current data streaming technologies, there exists a relatively long lag time between the time the data arrives in the buffer to the time it is available for use by the RDBMS.

Many applications need the fast response that is typical of in-memory databases, but also need the reliability and recoverability of traditional disk based relational database management systems. What these applications require is a method for copying data from the in-memory database to the on-disk RDBMS, such that the data can be easily recovered in the event of a machine crash.

Minimizing the lag time between the data written to the in-memory database and subsequently written to the RDBMS is critical. This lag should be as short as possible to minimize the loss of data in the event of a machine crash. In addition, if the data copied to the RDBMS is time stamped then the RDBMS effectively represents the state of the in-memory database over time. This allows for the possibility of recreating the in-memory database from the RDBMS for any point in time.

Conventional technologies that store streaming data in a buffer memory and then transfer this data to a database have relatively long lag times between the arrival of the data and the transfer to the database. What is therefore needed is a system and an associated method for reducing this lag time. The need for such system and method has heretofore remained unsatisfied.

SUMMARY OF THE INVENTION

The present invention satisfies this need, and presents a system, a computer program product, and an associated method (collectively referred to herein as "the system" or "the present system") for writing data from an in-memory database to a disk database in an efficient manner, moving data that is in-memory quickly to disk drive, and shortening the lag time.

The integration of data from in-memory to disk by the present system can be achieved by limiting the operations of the in-memory database to insert only (no updates). The present system shortens the lag time by reducing the number of transactions required to transfer data from in-memory database to disk memory. The present system does not write a complete transaction for each record. The overhead required for transactions can be quite large; performance is enhanced by minimizing the number of transactions performed.

The present system compiles into the RDBMS knowledge about the structure of the in-memory database and then uses end of transaction callbacks from the RDBMS to keep the two databases synchronized. The insert only restriction is possible for a large class of real-time applications such as in-memory databases for financial market data.

Only these in-memory databases are typically appended. The RDBMS also has a daemon that runs periodically, i.e., every few seconds, to find records in the in-memory database that have not yet been written to the RDBMS, and to write these records to the RDBMS inside a single transaction. If the transaction completes successfully, the in-memory database is updated to reflect which records have been "flushed" to the RDBMS. If the transaction fails, no action is taken. Coordination between the RDBMS and in-memory database is accomplished with spinlocks.

The present system synchronizes the in-memory database with the RDBMS; the lag time is on the order of seconds rather than minutes or more. In addition, if the RDBMS crashes but not the in-memory database, the RDBMS can readily resume synchronization with the in-memory database once the RDBMS recovers. Further, if it is not possible to synchronize due to a disk failure or some other temporary condition, the present system is able to recover and retry the synchronization.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Data stream: A flow of data from one place to another.

Feed: The data stream input to a computer program.

Internet: A collection of interconnected public and private computer networks that are linked together with routers by a set of standard protocols to form a global, distributed network.

World Wide Web (WWW, also Web): An Internet client-server hypertext distributed information retrieval system.

Figure 1:
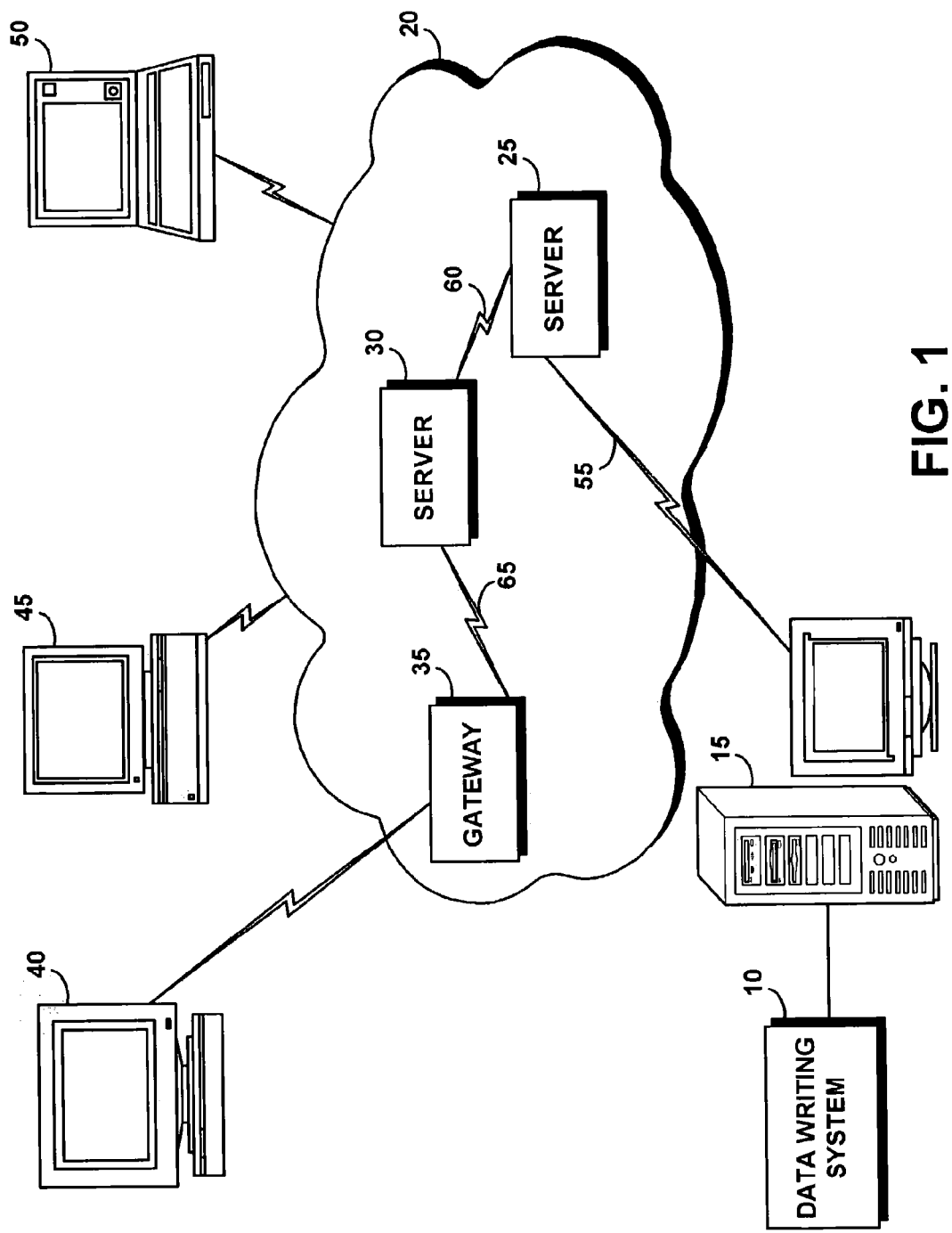
FIG. 1 is a schematic illustration of an exemplary operating environment in which a data writing system of the present invention can be used.

FIG. 1 portrays an exemplary overall environment in which a system and an associated method for writing data from an in-memory database to a disk database in an efficient manner according to the present invention may be used. System 10 comprises a software programming code or computer program product that is typically embedded within, or installed on a host server 15. Alternatively, system 10 can be saved on a suitable storage medium such as a diskette, a CD, a hard drive, or like devices. While the system 10 will be described in connection with the WWW, the system 10 can be used with a stand-alone database of terms that may have been derived from the WWW and/or other sources.

The cloud-like communication network 20 is comprised of communication lines and switches connecting servers such as servers 25, 30, to gateways such as gateway 35. The servers 25, 30 and the gateway 35 provide the communication access to the WWW or Internet. Users, such as remote Internet users, are represented by a variety of computers such as computers 40, 45, 50, and can query the host server 15 for desired information through the network 20. Computers 40, 45, 50 each comprise software that may allow the user to browse the Internet and interface securely with the host server 15. The host server 15 is connected to the network 20 via a communications link 55 such as a telephone, cable, or satellite link. The servers 25, 30 can be connected via high-speed Internet network lines 60, 65 to other computers and gateways.

Figure 2:
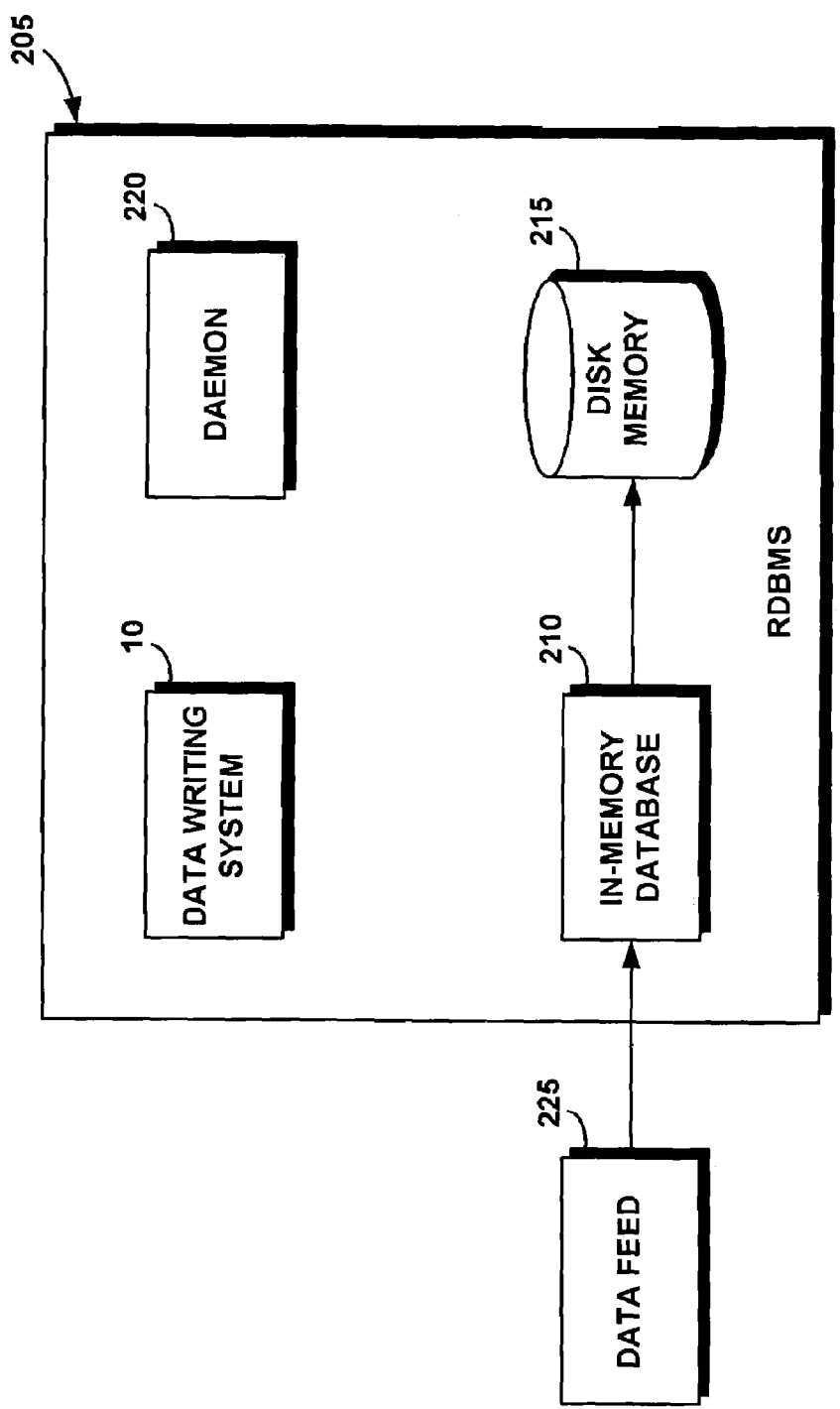
FIG. 2 is a block diagram of the high-level architecture of the data writing system of FIG. 1.

A high-level architecture of an exemplary relational database system (RDBMS) 205 in which system 10 may be used, is illustrated in the block diagram of FIG. 2. The RDBMS 205 generally comprises an in-memory database 210, a disk memory 215, a daemon 220, and the data writing system 10.

A data feed 225 continually provides data to the RDBMS 205 that is stored in the in-memory database 210. The daemon 220 wakes up periodically (for example, every few seconds) and checks whether there is data in the in-memory database 210 that needs to be written or transferred to disk memory. System 10 provides information to the daemon 220 that allows the daemon 220 to determine what data needs to be transferred and whether data that has been transferred has also been committed.

To keep the in-memory database 210 synchronized (i.e., in synch) with the RDBMS 205, a restriction is placed on the in-memory database 210. The in-memory database 210 does not update the records, but only appends the operations that are allowed.

Further, the RDBMS 205 adheres to the following restrictions. The RDBMS 205 should have direct read-only access to the records of the in-memory database 210. The RDBMS 205 should also be able to determine what new records have not yet been written to its disks. Once records have been committed to the disk, the RDBMS 205 should be able to record this fact in the in-memory database 210. The RDBMS 205 includes daemon 220 that wakes up periodically, i.e., every few seconds to determine what, if any data, should be read from the in-memory database 210 and written to disk.

The RDBMS 205 is allowed read-only access to the in-memory database 210. This insures that there are no race conditions when the RDBMS 205 is reading records while the in-memory database 210 is writing records. Race conditions occur when two or more processes are allowed to update a record simultaneously. If writers were allowed to write to the same record at the same time, then the last process to write to the record would "win" the race and its changes would be saved. The "winner" would overwrite the data that the first process had written and the RDBMS 205 has no record of changes made by the "loser".

In addition, a reader may attempt to read a record while it was being written. In this event, a "race" occurs between the writer and the reader wherein the writer attempts to get all the data written before the reader reads the record. If the reader "wins" the race, it will be reading uninitialized data. Consequently, race conditions should be avoided. System 10 solves the issue of read-only access by using a linked list for the in-memory database 210, with a primary key structure pointing at the data for each key. In this manner, adding a new record to the end of the list can be made into an atomic operation.

Figure 3:
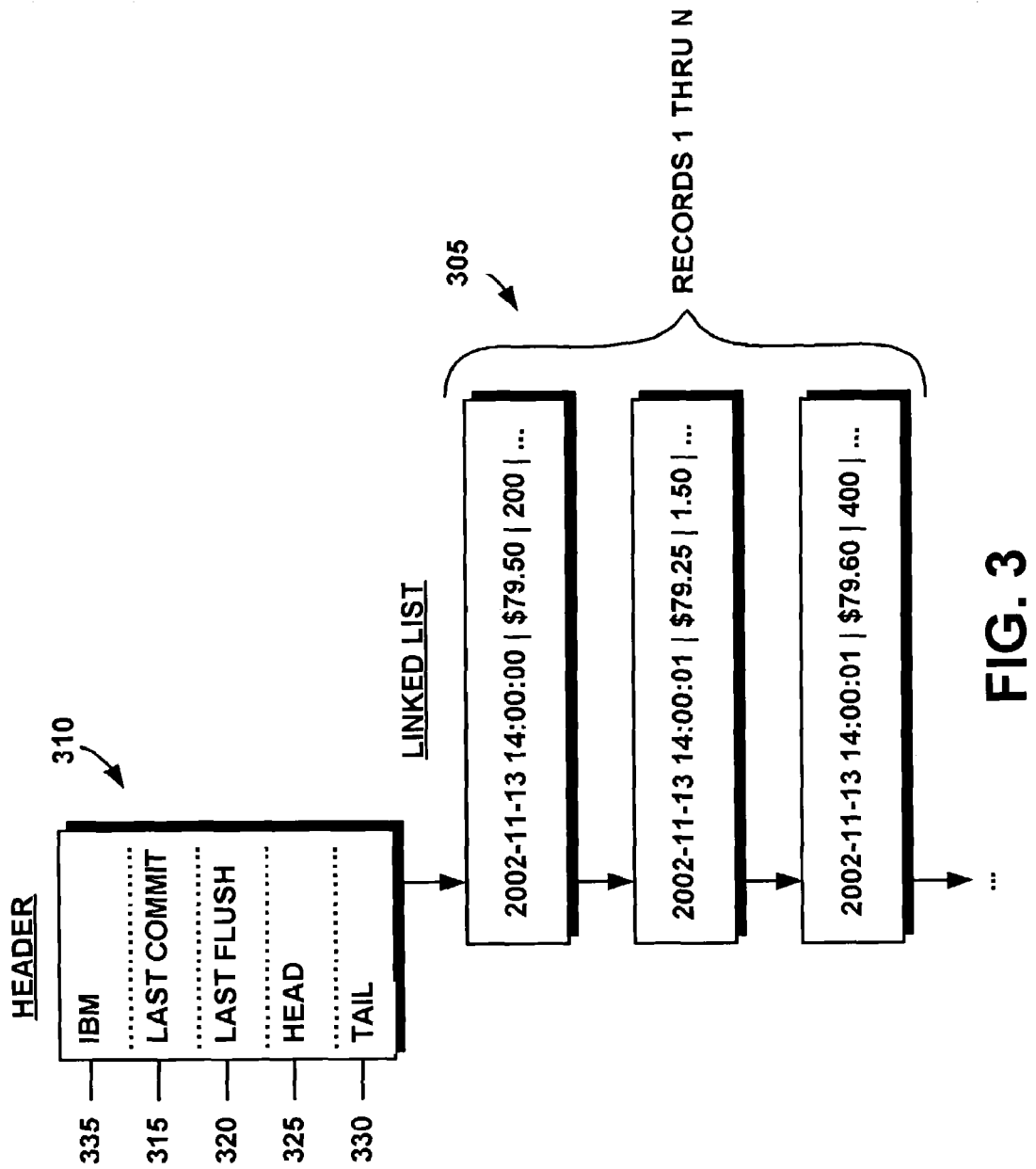
FIG. 3 is a block diagram illustrating a header data structure used by the data writing system of FIG. 1.

The RDBMS 205 should also be able to determine what new records have not yet been written to its disks. Once records have been committed to disk, the RDBMS 205 should be able to record this fact in the in-memory database 210. Consequently, the in-memory database 210 is required to provide some additional "pointers" to which the RDBMS 205 has exclusive access, as illustrated by FIG. 3.

An example of the application of system 10 involves an exemplary database of stock trades. The in-memory database 210 would have a data structure or header 310 to represent "IBM", for example, and would have a linked list 305 of records to which the "IBM" data structure points. Each record contains information about a single trade. The header 310 comprises a last commit pointer 315, a last flush pointer 320, a head pointer 325, and a tail pointer 330 (alternately referenced as a group as pointers 315, 320, 325, 330).

The in-memory database 210 uses the last commit pointer 315 and the last flush pointer 320 to keep track of the records that have been written to the disk but not yet committed, records that have not been written to disk, and the records that have been committed to disk. The last flush pointer 320 and last commit pointer 315 are used exclusively by the RDBMS 205. The last flush pointer 320 points at the last record that has been written to disk but not yet committed. The last commit pointer 315 points to the last record that was committed to the disk. The head pointer 325 and the tail pointer 330 maintain the linked list 305.

The header 310 also comprises key information, such as the name of the entity 335 that identifies the record. One example of key information would be the name of a stock such as "IBM". Records that have been written but not committed could be rolled back if the transaction they were written in were to be rolled back. Records that have been committed are permanently recorded in the database.

A record is created and initialized by the in-memory database 210. The tail pointer 330 of the linked list 305 is set to point at the new record since only append operations are allowed. If the RDBMS 205 is reading this linked list 305, it may or may not see this last record depending on the timing. In either case, the results that are returned are correct.

Figure 4:
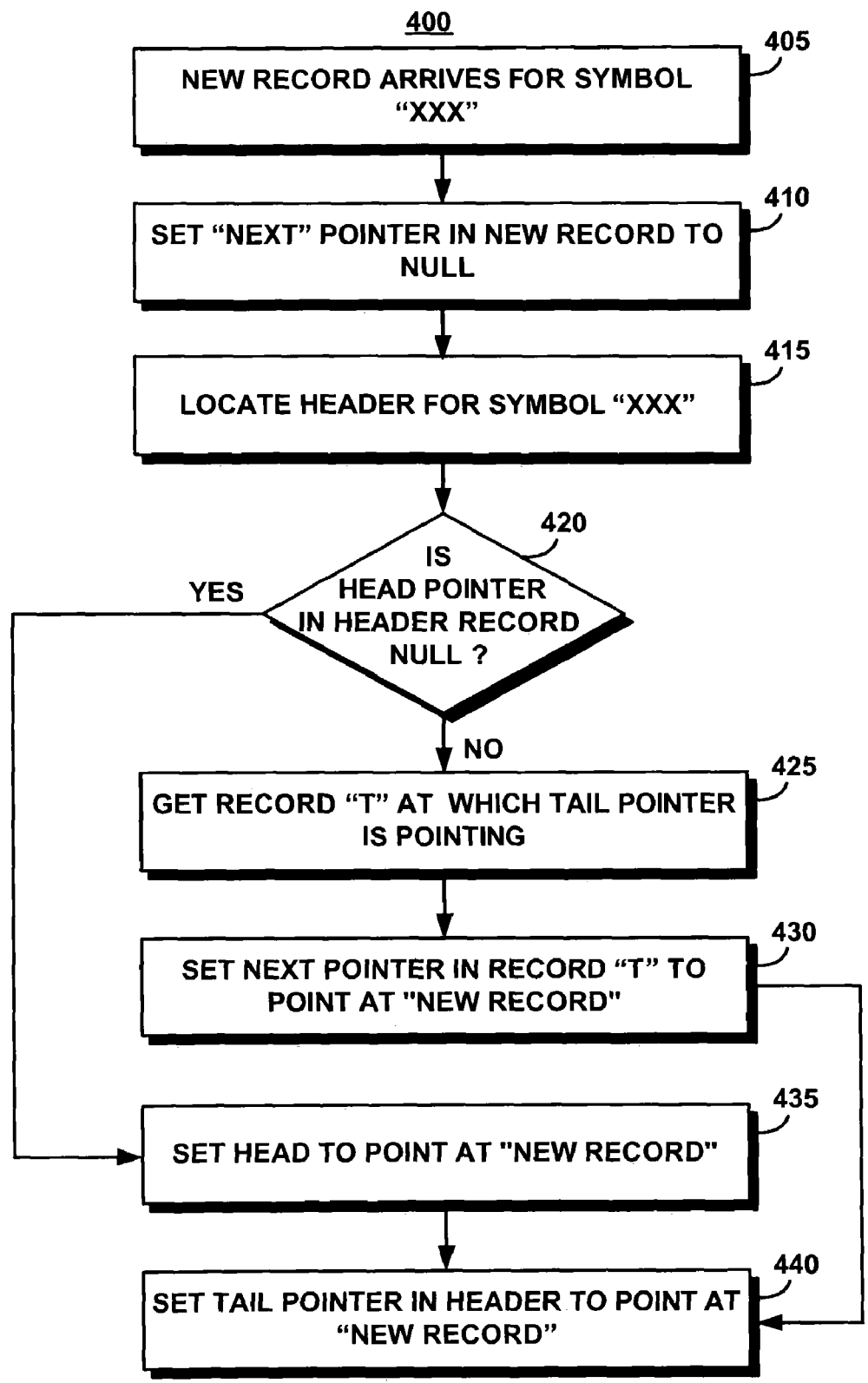
FIG. 4 is a process flow chart illustrating a method of operation for adding a new record to the end of a linked list used by the data writing system of FIGS. 1 and 2.

The process flow chart of FIG. 4 illustrates a method 400 of adding a new record to the end of the linked list 305. A new record for symbol "XXX" arrives at the in-memory database 210 at block 405 and time stamped. Each record comprises a field that indicates its record entity (i.e. "IBM" for stock trade data stream), a pointer to the next record, and additional data fields as required. The time stamp indicates the time that the record is sent to or received by the application such as the RDBMS 205. The new record is the last record in the linked list 305.

System 10 sets the "next" pointer in the new record to null at block 410. At block 415, system 10 locates the appropriate header 310 for the symbol "XXX"; the header 310 matches the record entity of the new record. At decision block 420, system 10 determines whether the head pointer 325 of the header 310 points is null. If no, system 10 gets the record "T" at which the tail pointer 330 is pointing (block 425).

System 10 then sets the "next" pointer of this record "T" to point at the new record (block 430), and sets the tail pointer 330 in header 310 to point at the new record (block 440).

If at decision block 420 the head pointer 325 in the header 310 is null, system 10 proceeds to block 435 and sets the head pointer 325 in the header 310 to point at the new record. It then proceeds to block 440 to set the tail pointer 330 in header 310 to point at the new record.

In general, records are "sitting" in the in-memory database 210 and the list of records in the in-memory database 210 is growing. System 10 moves those records to the disk memory 215. Initially, no records are in the disk memory. The last commit pointer 315 is the most recent record that's being written to the disk. When a record is written to the disk, it's not necessarily erased because the user may wish to query data on disk memory 215 and in the in-memory database 210. The last commit pointer 315 points to a record written on disk memory 215 so system 10 knows the location of the data being read.

The last flush pointer 320 points to a last record written to disk memory 215 whose transfer has not been committed. When data is written to RDBMS 205, the decision is made to either rollback the transaction or commit. Rollback removes the data from the disk. If the data is committed, system 10 moved the last flush pointer 320 to the last commit pointer 315, indicating where the last commit occurred.

The head pointer 325 points to a first record in a linked list. Comparisons between pointers 315, 320, 325, 330 are based on the timestamp in the record to which the pointer 315, 320, 325, 330 points. The pointers have the following relationship:

head pointer 325<=last commit pointer 315<=last flush pointer 320<=tail pointer 330.

One tail pointer 330 is less than or equal another pointer 315, 320, 325, 330 if it points to a record number with a timestamp that is less than or equal to the record of the other pointer 315, 320, 325, 330. A pointer 315, 320, 325, 330 that is null does not point to a record. In the case of a null pointer 315, 320, 325, 330, the timestamp for the missing record is considered to be the earliest possible timestamp (0001-01-01 00:00:00.00000).

The pointers 315, 320, 325, 330 can be in the following state where the timestamp of the record to which the last commit pointer 315 points is equal to the time stamp of the record to which the last flush pointer 320 points. If the relative timestamp of the last commit pointer 315 is equal to the relative timestamp of the last flush pointer 320, all records written to the disk memory 215 have either been committed or aborted by the RDBMS 205.

If the timestamp of the record to which the tail pointer 330 points is equal to the timestamp of the record to which the last flush pointer 320 points then there are no ticks or records waiting to be flushed or committed. All records with timestamps greater than or equal to the value of the head pointer 325 and less than or equal to the last commit pointer 315 have been committed to the RDBMS 205. This same condition is true if the last flush pointer 320 is null.

Alternatively, the pointers 315, 320, 325, 330 can be in the following state, where the timestamp of the record to which the last commit pointer 315 points is less than the timestamp of the record to which the last flush pointer 320 points. In this state, all records with timestamps greater than the relative timestamp of the last commit pointer 315 and less than or equal to the last flush pointer 320 have been written to the RDBMS 205, but neither committed nor aborted. All records with timestamps greater than the last flush pointer 320 and less than or equal to the value of the tail pointer 330 need to be flushed to disk. If the last flush pointer 320 is equivalent to the value of the tail pointer 330 then there are no ticks or records that need to be flushed.

When the database daemon 220 wakes up, it looks at the last commit pointer 315 and tail pointers 330 in each of the headers 310 for any data that should be flushed to disk. Any records that are greater than the last flush pointer 320, and less than, or equal to the tail pointer 330 can be flushed. When the first such header 310 is found, a transaction is started, an end of transaction callback is registered, and all qualifying ticks are written to the disk memory 215. When all records have been written for a particular header 310 the daemon changes the last flush pointer 320 to point at the last record written. The daemon continues looking at all the headers 310 in the in-memory database 210 until all have been examined.

Figure 5A:
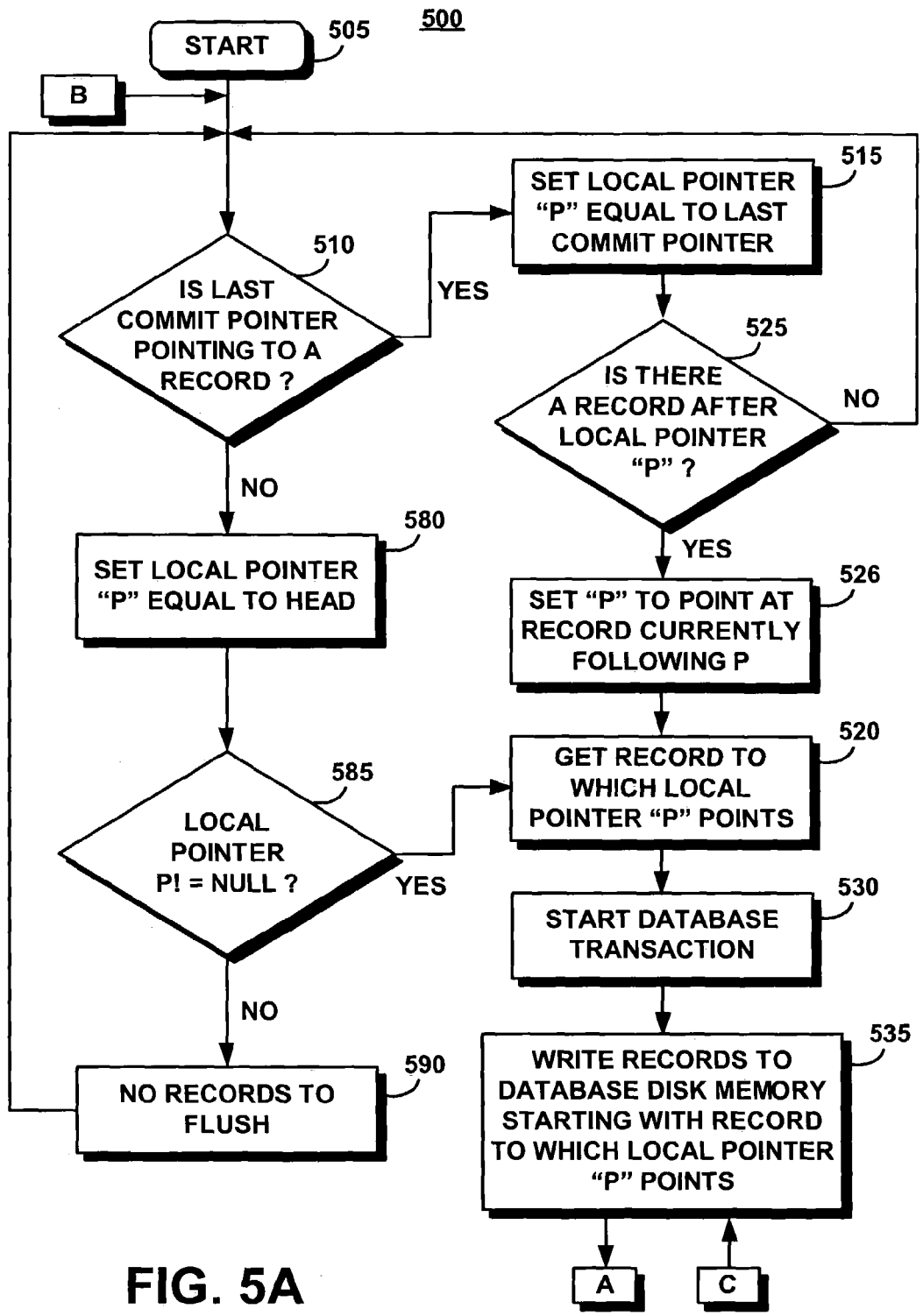
FIG. 5 is comprised of FIGS. 5A and 5B, and represents a process flow chart illustrating a method of operation for transferring records from an in-memory to a disk memory, using the data writing system of FIGS. 1 and 2.
Figure 5B:
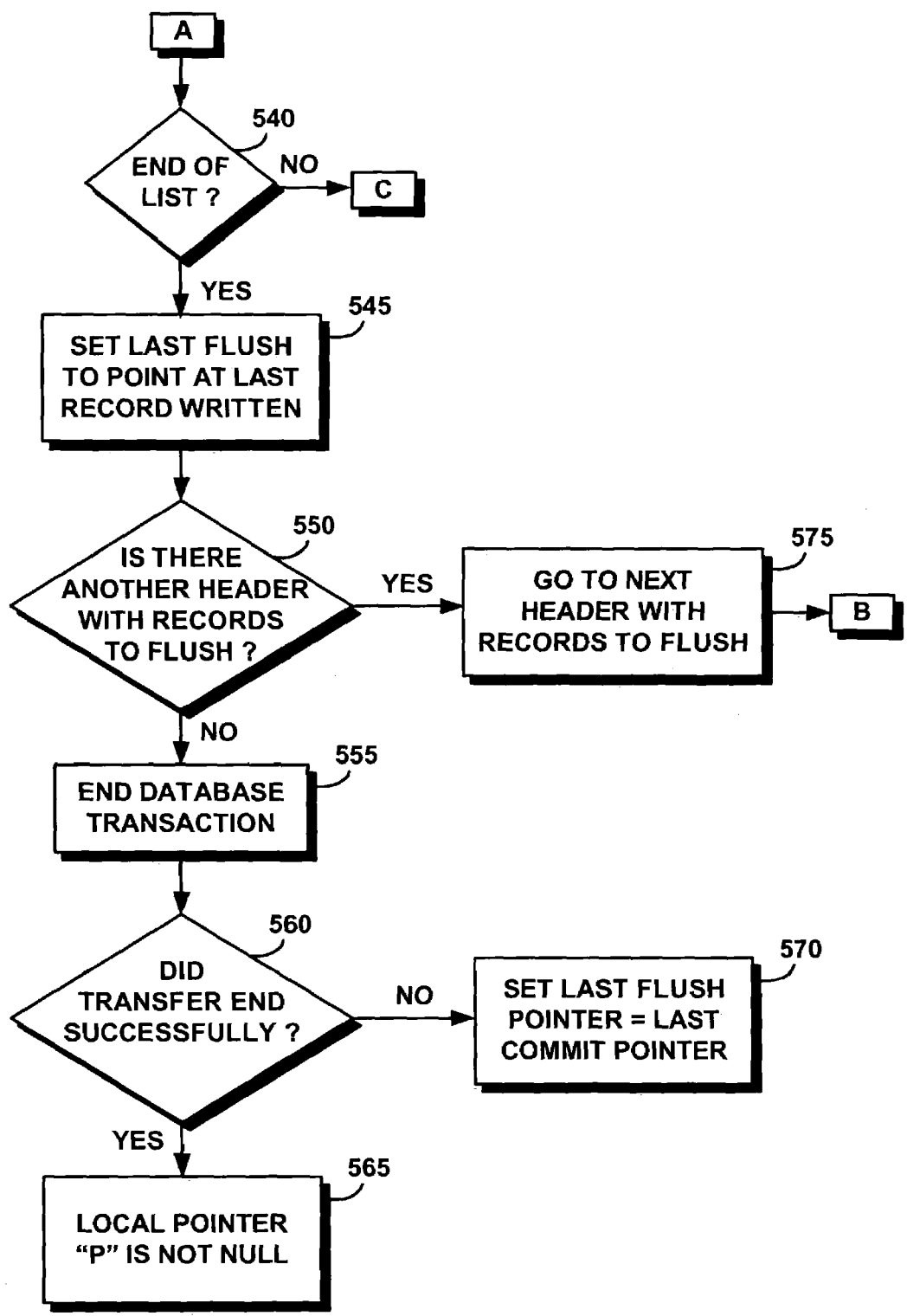

A method 500 of writing data from the in-memory database 210 to disk memory 215 is illustrated by the process flow chart of FIG. 5 (FIGS. 5A, 5B). The daemon 220 wakes up and looks at the tail pointers 330 in each header 310 (block 505). At decision block 510, system 10 determines whether the last commit pointer 315 is pointing to a record. If it does, system 10 sets the local pointer "P" equal to the last commit pointer 315 in the header 310 at block 515. System 10 gets the record to which the local pointer "P" points (block 520).

At decision block 525, system 10 determines if there exists a record in the linked list 305 after the local pointer "P". If not, system 10 returns to the beginning of the process (block 505). Otherwise, system 10 set local pointer "P" to the next record (block 526), and starts the transfer of records from the in-memory database 210 to the disk memory 215 (block 530). System 10 writes those records to the disk memory 215 of RDBMS 205 starting with the record to which the local pointer "P" points (block 535).

System 10 writes records to the disk memory 215 until the end of the linked list 305 is reached (decision block 540). When the end of the linked list 305 is reached, system 10 sets the last flush pointer 320 to point at the last record written (block 545). At decision block 550, system 10 determines whether there is another header 310 with records to flush. If not, system 10 ends the transfer at block 555 (FIG. 5B). If system 10 determines at decision block 560 that the transfer ended successfully, system 10 sets the value of the last commit pointer 315 to the count of the last record transferred (block 565). If at decision block 560 the transfer did not end successfully, system 10 sets the last flush pointer 320 equal to the last commit pointer 315.

If at decision block 550 there is an additional header 310 with records to flush, system 10 goes to the next header 310 with records to flush (block 575) then returns to block 505 to repeat the method 500 of system 10.

Returning to decision block 510, if system 10 determines that the last commit pointer 315 is not pointing to a record, system 10 proceeds to block 580 and sets the local pointer "P" to the value of the head pointer 325. If at decision block 585 the local pointer "P" is not null, then it is determined that there exist certain records that need to be written to the disk memory 215. System 10 then continues to block 520 and proceeds as described earlier.

If at decision block 585 the local pointer "P" is null, no records exist to be written to the disk memory 215 (block 590) and system 10 returns to the beginning (block 505). Method 500 is repeated for each header 310.

Once all the qualifying records have been written to the disk, the transaction is committed. The last step in committing the transaction is to call the registered end of transaction callbacks. The end of transaction callback determines whether the transaction committed or aborted.

If the transaction is committed, then for each header 310, system 10 sets the last commit pointer 315 equal to the last flush pointer 320. If the transaction has been aborted, system 10 returns with no work required. If the transaction did abort, the last flush pointer 320 may be left pointing at a record that was written but due to the abort may have been rolled back. Since the database daemon always flushes records starting at the last commit pointer 315, not the last flush pointer 320 this is not a problem.

It is to be understood that the specific embodiments of the invention that have been described are merely illustrative of certain application of the principle of the present invention. Numerous modifications may be made to the system and method for writing data from an in-memory database to a disk database in an efficient manner invention described herein without departing from the spirit and scope of the present invention. Moreover, while the present invention is described for illustration purpose only in relation to the WWW, it should be clear that the invention is applicable as well to databases contrived from systems linked through local area networks, wide area networks, etc., and to stand-alone systems.

What is claimed is:

1. A processor-implemented method of efficiently writing records from an in-memory database to a disk database comprising:
   linking the records by a linked list;
   creating a header data structure of the linked records;
   linking a new record in the in-memory database to the header data structure;
   transferring the records in the linked list and the new record from the in-memory database to the disk database using the header data structure;
   wherein transferring the records includes transferring blocks of the records as a single transaction to the disk database, in order to minimize a number of transfers from the in-memory database to the disk database;
   dynamically setting a last commit pointer and a last flush pointer to keep track of: (i) a block of the records that have been transferred to the disk database but not yet committed: (ii) a block of the records that have not been transferred to the disk database: and (iii) a block of the records that have been transferred and committed to the disk database, in order to maintain synchronization between the in-memory database and the disk database; and
   determining whether a committing operation of the block of the records that have been transferred to the disk database but not yet committed is successful, and if the committing operation is determined to be unsuccessful, deeming the committing operation of all the records in the block of the records that have been transferred to the disk database but not yet committed is successful, to have failed.

2. The method of claim 1, wherein each record contains information about a single transaction.

3. The method of claim 1, wherein the header data structure comprises an entity name that identifies the new record.

4. The method of claim 3, wherein the header data structure further comprises a last commit pointer.

5. The method of claim 4, wherein the header data structure further comprises a last flush pointer.

6. The method of claim 5, wherein the header data structure further comprises a head pointer.

7. The method of claim 6, wherein the header data structure further comprises a tail pointer.

8. The method of claim 7, further comprising locating a new header data structure for the new record.

9. The method of claim 8, further comprising determining if the head pointer in the header data structure of the new record points to another record.

10. The method of claim 9, wherein if the head pointer in the header data structure of the new record points to another record getting the other record.

11. The method of claim 7, further comprising determining if the last commit pointer of the header data structure points at a record.

12. The method of claim 11, further comprising setting the last commit pointer equal to the head pointer if the last commit pointer does not point to a record.

13. The method of claim 11, further comprising getting the record to which the last commit pointer points.

14. The method of claim 13, further comprising determining whether there is a last record after the record to which the last commit pointer points.

15. The method of claim 14, further comprising writing to the disk database all records in the link list that occur after the record to which the last commit pointer points.

16. The method of claim 15, further comprising setting a last flush pointer of the header data structure equal to a last count if the writing of the records to the disk memory ended successfully.

17. The method of claim 16, further comprising setting the last flush pointer equal to the last commit pointer if the writing of the records to the disk memory did not end successfully.

18. A computer program product having instruction codes stored on a computer-readable medium for efficiently writing records from an in-memory database to a disk database, comprising:
   a set of instruction codes for linking the records by a linked list;
   a set of instruction codes for creating a header data structure of the linked records;
   a set of instruction codes for linking a new record in the in-memory database to the header data structure; and
   a set of instruction codes for transferring the records in the linked list and the new record from the in-memory database to the disk database using the header data structure;
   wherein the set of instruction codes for transferring the records includes a set of instruction codes for transferring blocks of the records as a single transaction to the disk database, in order to minimize a number of transfers from the in-memory database to the disk database;
   a set of instruction codes for dynamically setting a last commit pointer and a last flush pointer to keep track of: (i) a block of the records that have been transferred to the disk database but not yet committed; (ii) a block of the records that have not been transferred to the disk database; and (iii) a block of the records that have been transferred and committed to the disk database, in order to maintain synchronization between the in-memory database and the disk database; and a set of instruction codes for determining whether a committing operation of the block of the records that have been transferred to the disk database but not yet committed is successful, and if the committing operation is determined to be unsuccessful, deeming the committing operation of all the records in the block of the records that have been transferred to the disk database but not yet committed is successful, to have failed.

19. The computer program product of claim 18, wherein each record contains information about a single transaction.

20. The computer program product of claim 17, wherein the header data structure comprises an entity name that identifies the new record.

21. The computer program product of claim 20, wherein the header data structure further comprises a last commit pointer.

22. The computer program product of claim 21, wherein the header data structure further comprises a last flush pointer.

23. The computer program product of claim 22, wherein the header data structure further comprises a head pointer.

24. The computer program product of claim 23, wherein the header data structure further comprises a tail pointer.

25. A processor-implemented system for efficiently writing records from an in-memory database to a disk database, comprising:

means for linking the records by a linked list;

means for creating a header data structure of the linked records;

means for linking a new records in the in-memory database to the header data structure;

means for transferring records in the linked list and the new record from the in-memory database to the disk database using the header data structure;

wherein the means for transferring the records includes a means for transferring blocks of records as a single transaction to the disk database, in order to minimize a number of transfers from the in-memory database to the disk database;

means for dynamically setting a last commit pointer and a last flush pointer to keep track of: (i) a block the records that have been transferred to the disk database but not yet committed; (ii) a block the records that have not been transferred to the disk database: and (iii) a block of the records that have been transferred and committed to the disk database, in order to maintain synchronization between the in-memory database and the disk database; and means for determining whether a committing operation of the block of the records that have been transferred to the disk database but not yet committed is successful, and if the committing operation is determined to be unsuccessful, deeming the committing operation of all the records in the block of the records that have been transferred to the disk database but not yet committed is successful, to have failed.

26. The system of claim 25, wherein each record contains information about a single transaction.

27. The system of claim 25, wherein the header data structure comprises an entity name that identifies the new record.

28. The system of claim 27, wherein the header data structure further comprises a last commit pointer.

29. The system of claim 28, wherein the header data structure further comprises a last flush pointer and a head pointer.

* * * * *